UNITED STATES PATENT OFFICE 2,685,600

METHOD OF CARBOXYLATING PHENOLS

John R. Morris, Fishkill, and James R. Roach, Beacon, N. Y., assignors to The Texas Company, New York, N. Y., a corporation of Delaware No Drawing. Application April 18, 1952, Serial No. 283,126

14 Claims. (Cl. 260—521)

The present invention relates to the production of hydroxy aromatic carboxylic acid compounds. More particularly, the invention relates to the production of such compounds by the carboxylation with carbon dioxide of alkali metal salts of phenols.

It is well known that hydroxy aromatic acids may be prepared by the reaction of alkali metal phenates with carbon dioxide at elevated temperatures in the absence of water. This process, which is known as the Kolbe process, is employed for the production of salicylic and 2-hydroxy-3-naphthoic acids on an industrial scale. The industrial process is usually carried out by reacting an alkali metal salt of a suitable phenolic compound with carbon dioxide at a temperature in the range of from about 100° C. to about 300° C. under superatmospheric pressure, in the absence of water and in the presence or absence of other solvents. However, complete conversion of the phenolic compound to the corresponding acid is not ordinarily obtainable in this process, particularly when substituted phenolic compounds are employed as reactants. With high molecular weight alkyl phenols, for example, such as are employed in the production of oil-soluble compounds, a maximum conversion of about 80% has been obtained, conversions ordinarily amounting to from about 40% to about 60%. Separation of the high molecular weight phenols and hydroxy acids in the reaction product is difficult and adds considerably to the cost of the process.

In accordance with this invention, phenolic compounds are converted to hydroxy aromatic acids by reacting them in the form of their alkali metal salts with carbon dioxide in two or more reaction stages, with treatment of the reaction mass between the stages with a suitable reagent to convert compounds containing free hydroxy or carboxy groups into the corresponding alkali metal derivatives. The process is carried out in the absence of water at temperatures in the range of from about 100° C. to about 300° C., preferably in the range of from about 140° C. to about 250° C., and preferably under superatmospheric pressures up to about 1,000 pounds per square inch or higher, with the same or different conditions being employed in the different reaction stages. The process is suitably carried out in two reaction stages, with the reaction in the first stage carried out until the phenolic compound is about 40–60% converted to the acid or until substantially no further reaction takes place. Solvents such as paraffinic hydrocarbons, naphthalene, halogenated benzene, etc., may be employed if desired to impart fluidity to the reaction mass.

Treatment of the reaction mass between the reaction stages to convert compounds containing free hydroxy or carboxy groups to their alkali metal derivatives may be by means of free alkali metal or by a suitable alkali metal compound, such as an alkali metal hydroxide, metholate, etc. When an alkali metal hydroxide is employed for this purpose the reaction water is removed before the succeeding carboxylation stage, conveniently by distillation or by adding a drying agent such as calcium chloride to the mass. Preferably, an amount of alkali metal or alkali metal compound is employed which is approximately sufficient to react with all free hydroxy and carboxy groups present; it is sometimes desirable to employ a small excess of alkali metal or alkali metal compound up to about a 10% excess.

We have found that by carrying out the carboxylation process according to the method described above, quantitative conversions of phenolic compounds to the corresponding hydroxy aromatic acids are obtainable, even with highly substituted or high molecular weight phenolic compounds which have been converted heretofore only in very low yields. In addition to the improved yields obtainable, this process offers the further very considerable advantage over the processes employed heretofore in that a pure product may be obtained directly without the necessity for separating unconverted phenolic compounds.

Phenolic compounds which may be employed in this process include both mono-cyclic and polycyclic hydroxy aromatic compounds and their derivatives wherein one or more hydrogen atoms attached to the aromatic nucleus is substituted by a hydrocarbon group or other group which is unreactive in the carboxylation reaction, as for example alkoxy groups, aroxy groups, chlorine atoms, amino groups, nitro groups, etc. As examples of suitable phenolic compounds may be mentioned phenol, cresol, alpha naphthol, beta naphthol, 2-tertiary butyl-4-methyl phenol, hydroxydiphenyl, hydroquinone, anthranol, chlorophenol, hexadecyl phenol, docosylene phenol and 2,5-dinonyl phenol.

A particularly valuable application of this invention is found in the production of oil-soluble hydroxy aromatic acids, by employing in the reaction hydroxy aromatic compounds containing aliphatic groups of sufficient chain length to impart oil-solubility to the final product. For example, oil-soluble alkyl salicylic acids suitable for use as lubricant additives may be produced by this method by employing alkyl phenols containing from about 8 to about 35 aliphatic carbon atoms as the phenolic reactant. Alkyl phenols of this type may be readily obtained by the alkylation of phenol according to conventional methods, or by the extraction of these compounds from coal tar distillates or cracked petroleum distillates with aqueous alkali followed by acidification of the aqueous extract.

The terms "alkyl phenol," "alkyl salicyclic acid," etc., are used for convenience in the specification and claims to mean compounds containing one or more aliphatic hydrocarbon groups, which may be either saturated or unsaturated in character.

In preparing oil-soluble alkyl salicylic acids, the high molecular weight alkyl phenols in the form of their alkali metal salts, suitably in the form of their sodium or potassium salts, are reacted with carbon dioxide according to the method described above. The reaction is preferably carried out at a temperature in the range of from about 140° C. to about 190° C. and under a pressure of from about 200 pounds per square inch to about 800 pounds per square inch. It is most advantageously carried out at a temperature in the range of from about 160° C. to about 170° C. and under a pressure in the range of from about 400 to about 600 pounds per square inch gauge.

The following examples, which serve to more fully disclose the invention, give detailed procedures which were employed for the carboxylation of various high molecular weight alkyl phenols according to the preferred method of carrying out the invention.

Example 1

An alkyl phenol was prepared in the following manner: 1065 grams of phenol and 225 grams of $AlCl_2.HSO_4$, obtained by the addition of 95% sulfuric acid to anhydrous aluminum chloride, were placed in a 12 liter flask fitted with a stirrer, reflux condenser, dropping funnel and thermometer. The flask and contents were heated to 80° C. and maintained at this temperature while 1245 grams of an olefinic polymer were added dropwise. The olefinic polymer employed was a fraction, boiling at 100°–160° C. under a vacuum of 2–3 millimeters of mercury, of a material obtained by the polymerization of $C_3$ and $C_4$ olefins. After addition of the olefin polymer, the reaction mixture was stirred at 80° C. for 24 hours. Water was then added to decompose the catalyst, the mixture allowed to settle, and the organic layer withdrawn and washed with 1500 cc. of 10% hydrochloric acid. It was then diluted with benzene, washed with water until neutral and dried over calcium chloride. The benzene was finally stripped out on a steam bath and the product distilled under a vacuum of 2 millimeters of mercury, the fraction boiling at 176°–235° C. being recovered for use in the subsequent carboxylation process. 478 grams of this material were obtained, having an OH number of 125–121, corresponding to a molecular weight of 456.

The alkyl phenol obtained as described above was converted to the sodium salt by treating it with metallic sodium. In carrying out the conversion, 25 grams of sodium metal, corresponding to an excess of about 8.7% over the calculated required amount, were melted under toluene and 456 grams of the alkyl phenol added. The mass was then refluxed for 20 hours, after which 350 grams of a paraffinic SAE grade 10 lubricating oil were added and the solvent stripped out on a steam bath.

The solution of sodium alkyl phenate obtained as described above was transferred to a pressure reactor together with an additional 100 grams of the SAE grade 10 lubricating oil, and heated for 5 hours at an average temperature of 163° C. under a carbon dioxide pressure of 220 pounds per square inch gauge. The reaction mass was then cooled and taken up with ether, the ether solution washed 3 times with dilute hydrochloric acid and then with water until the washings were neutral to Congo red, and the ether stripped out on a steam bath. 908 grams of product were obtained. In order to separate the lubricating oil solvent, this product was added to a mixture of 150 grams of sodium hydroxide, 750 cc. of water and 1125 cc. of ethanol, the solution heated with stirring on a steam bath and then allowed to settle for 20 hours. The lower layer of the settled solution was washed 3 times with dilute hydrochloric acid and then with water until the washings were neutral to Congo red, and dried by refluxing with benzene. 500 grams of product were obtained. Two samples of this product were titrated with an alcoholic potassium hydroxide solution, as follows:

| | | | |
|---|---|---|---|
| Wt. sample | 1.5956 | -------- | 1.6236 |
| cc. KOH | 3.6 | -------- | 3.5 |
| Normality KOH | -------- | 0.3694 | -------- |
| Equivalent wt | 1,200 | -------- | 1,250 |
| Average equivalent wt | -------- | 1,225 | -------- |
| Calculated equivalent wt | -------- | 500 | -------- |

The product therefore was only about 40% alkyl salicylic acid, the remainder being unconverted alkyl phenol.

The above product was again reacted with carbon dioxide in a second carboxylation step, after treating it with sodium in the calculated amount required to convert all hydroxy and carboxy groups to the sodium derivatives. The treatment with sodium was carried out by melting 33 grams of sodium under toluene and then slowly adding 496 grams of the carboxylation product. The mass was then refluxed for 16 hours, after which 400 grams of SAE grade 10 lubricating oil were added and the toluene stripped out. The oil solution was transferred to the pressure reactor and heated for 5 hours at 165.6° C. under a carbon dioxide pressure of 220 pounds per square inch gauge. The reaction mass was then cooled and added to a mixture of 40 grams of sodium hydroxide in 750 cc. of water and 1125 cc. of alcohol. The solution was stirred on a steam bath for 2 hours and then allowed to settle for 20 hours. The lower layer which separated out was again acidified with dilute hydrochloric acid and worked up as before. 410 grams of product were obtained. Samples of this product were titrated with alcoholic potassium hydroxide as follows:

| | | | |
|---|---|---|---|
| Wt. sample | 0.1665 | -------- | 0.5059 |
| cc. KOH | 1.50 | -------- | 4.50 |
| Normality KOH | -------- | 0.2212 | -------- |
| Equivalent wt | 502 | -------- | 508 |
| Average equivalent wt | -------- | 505 | -------- |
| Calculated equivalent wt | -------- | 500 | -------- |

The above results show that the alkyl salicylic acid content of the product was 99%.

Example 2

An alkyl phenol was prepared in the manner described in Example 1, employing phenol and olefin polymer in approximately a 3:1 ratio by weight and $AlCl_2.HSO_4$ as the catalyst. The olefin polymer was a material of the same type as that employed in Example 1, except that a fraction boiling at 100°–140° C. under a vacuum of 1 millimeter of mercury was employed. A product having an hydroxyl number of 97.1–96.5, corresponding to a molecular weight of 578–581, was obtained.

The alkyl phenol was converted to the sodium salt and carboxylated with carbon dioxide in two stages according to the method described in Example 1, substantially the only difference being that longer reaction times were employed, the reaction time in the first stage being equal to the total reaction time of both carboxylation stages of Example 1. In preparing the sodium salt, 15.05 grams of sodium, corresponding to about a 1% excess, were melted under toluene and 375 grams of the alkyl phenol added dropwise. The solution was then refluxed for 6 hours and allowed to stand for 2 days, after which 300 grams of SAE grade 10 lubricating oil were added and the toluene stripped out. The solution of sodium alkyl phenate in lubricating oil thus obtained was transferred to a pressure reactor and heated for 10 hours at 163° C. under a carbon dioxide pressure of 270 pounds per square inch gauge, with stirring. The contents of the reactor were then taken up with ether, washed 3 times with dilute hydrochloric acid and finally with water until the washings were neutral to Congo red, and the solvent stripped out. Titration of a sample of the residue with standard alcoholic caustic solution as described in Example 1 showed that it contained only about 50% alkyl salicylic acid.

The above product was again reacted with carbon dioxide in a second carboxylation step, after treating it with sodium in about 2.7% excess of the calculated amount required to convert all hydroxy and carboxy groups to the sodium derivatives. The treatment with sodium was carried out by melting 23 grams of sodium metal under toluene and slowly adding the product from the first carboxylation stage. The solution was refluxed for 6 hours, after which the toluene was finally stripped out. The resulting oil solution was then treated with carbon dioxide for 8 hours at 163° C. under a carbon dioxide pressure of 275 pounds per square inch gauge. The reaction mass was taken up with ether, washed 3 times with 700 cc. of 10% hydrochloric acid and finally with water and the ether stripped out. 572 grams of product were obtained, comprising an approximate 50% solution of reaction product in lubricating oil. Titration of samples of this solution with standard caustic solution showed that the reaction product contained 96.4% alkyl salicylic acid.

*Example 3*

An alkyl phenol having a molecular weight of 430–435, as determined on the basis of the hydroxyl number, was prepared by alkylating phenol with an olefin fraction of the same type as that employed in preparing the alkyl phenol of Example 2. The alkylation was carried out in the same manner as described in Example 1 with the exception that aluminum chloride dissolved in nitromethane was employed as the catalyst. 410 grams of this alkyl phenol were reacted with 22 grams of sodium, or about a 0.5% excess of the calculated required amounts, in toluene solution as described in Example 1, the toluene stripped off and the sodium alkyl phenate dissolved in 410 grams of SAE grade 10 lubricating oil.

Carboxylation was carried out in two stages substantially as described in Examples 1 and 2, with the exception that the step of isolating the mixture of reacted and unreacted alkyl phenol after the first carboxylation stage was omitted. In the first carboxylation stage the lubricating oil solution of sodium alkyl phenate was heated overnight at 110° C. under a carbon dioxide pressure of 250 pounds per square inch guage, and finally for eight hours at 160–170° C. under a carbon dioxide pressure of 300 pounds per square inch gauge. The reaction mass was then taken up in toluene and retreated with 13 grams of sodium, which was the calculated amount required to react with all free hydroxy and carboxy groups present in the mass. This amount was determined by pipetting a sample of the toluene solution into a beaker, stripping off the toluene, weighing, dissolving in alcohol and titrating with standard caustic solution. On the basis of this titration, approximately a 60% conversion of the phenol had occurred in the first carboxylation stage.

After the reaction mass was retreated with sodium the toluene was stripped off and the lubricating oil solution returned to the pressure reactor and again treated with carbon dioxide under a pressure of 250 pounds per square inch gauge and at 160–170° C. for 8 hours. The product was taken up in ether, washed with dilute hydrochloric acid and with water until the washings were neutral, and the ether stripped out. The product was obtained as a 50% concentrate in lubricating oil, the weight of the solution being 776 grams. Titration of a sample of this solution with standard caustic solution showed that the reaction product consisted 94% of alkyl salicylic acid.

*Example 4*

An alkyl phenol having a molecular weight of 490, as determined on the basis of the hydroxyl number, was prepared by alkylating phenol with an olefin polymer according to the method described in Example 1. This alkyl phenol was converted to the sodium salt by dissolving it in an equal volume of butanol, adding caustic pellets in equimolar weight corresponding to the weight of alkyl phenol and stirring the mixture vigorously at 90° C. until all the caustic was dissolved. The water of reaction was removed as an azeotropic mixture of water and butanol, and the butanol finally removed by vacuum distillation. 1023 grams of the sodium alkyl phenate thus obtained were dissolved in 1125 grams of a refined naphthenic lubricating oil having an SUS viscosity at 100° F. of about 300 to form the charge for the carboxylation process.

Carboxylation of the sodium alkyl phenate was carried out in two stages under higher pressures than those employed in the previous examples. In the first carboxylation stage, the sodium alkyl phenate in lubricating oil solution was heated for 2 hours at 166° C. under a carbon dioxide pressure of 670 pounds per square inch gauge. The product was diluted with benzene and washed with dilute hydrochloric acid and finally with water until the washings were neutral. The benzene was then stripped out, and 1049 grams of the product were recovered comprising approximately a 50% concentrate of reaction product in lubricating oil. Titration of a sample of this solution with standard potassium hydroxide solution showed that the reaction product contained 62.5% of acid, the remainder being unreacted phenol.

The above reaction product in lubricating oil solution from the first stage carboxylation was again converted to the sodium derivatives by reaction with solid sodium hydroxide in methanol solution, followed by evaporation of the water of reaction and the methanol. The amount of sodium hydroxide employed was the theoretical amount required to react with all the carboxy and hydroxy groups with a 5% excess. 1000 grams of the reaction mixture thus obtained were reacted in the second carboxylation stage at 171° C. for 2 hours under a carbon dioxide pressure of 540 pounds per square inch gauge. The product was again taken up in benzene and worked up as before. 1017 grams of product were recovered comprising approximately a 50% concentrate of reaction product in lubricating oil. By titration with standard potassium hydroxide a neutralization number was found for this product corresponding to a 101.0% conversion of the phenol to alkyl salicylic acid.

Example 5

An alkyl phenol having a molecular weight of 466, as determined on the basis of the hydroxyl number, was prepared by alkylating phenol with an olefin polymer according to the method described in Example 1. This alkyl phenol was converted to the sodium salt by dissolving it in an equal volume of butanol, adding caustic pellets in equimolar weight corresponding to the weight of alkyl phenol and stirring the mixture vigorously at 90° C. until all the caustic was dissolved. The water of reaction was removed as an azeotropic mixture of water and butanol, and the butanol finally removed by vacuum distillation.

Carboxylation of the sodium alkyl phenate was carried out in two stages substantially under the same conditions as employed in Example 4, except that it was carried out in the absence of a solvent. In the first stage 319 grams of the sodium alkyl phenate were heated for 2 hours at 165° C. under a carbon dioxide pressure of 500 pounds per square inch gauge. The product was diluted with benzene and washed with dilute hydrochloric acid and finally with water until the washings were neutral. The benzene was then stripped out, and 327 grams of product were recovered. Titration of a sample of this reaction product with standard potassium hydroxide showed that it contained 68.2% of alkyl salicylic acid, the remainder being unreacted phenol.

The above reaction product from the first stage carboxylation was again converted to the sodium derivatives by reaction with solid sodium hydroxide in methanol solution, followed by evaporation of the water of reaction and the methanol. The amount of sodium hydroxide employed was the theoretical amount required to react with all the carboxy and hydroxy groups with a 5% excess. 300 grams of the reaction mixture thus obtained were reacted in the second carboxylation stage at 165° C. for 2 hours under a carbon dioxide pressure of 500 pounds per square inch gauge. The product was taken up in benzene and again worked up as described in connection with the first carboxylation stage. 309 grams of product were recovered. Titration of a sample of this product with standard potassium hydroxide showed that it contained 99.4% of alkyl salicylic acid.

Example 6

Dinonylphenol, obtained in substantially pure form by fractionation of a phenol alkylate product, was carboxylated under substantially the same conditions as were employed in Example 5. 705 grams of sodium dinonylphenolate, obtained as described in Example 5, were reacted in the absence of a solvent in the first stage at 165° C. for 2 hours under a carbon dioxide pressure of 500 pounds per square inch gauge. The product was taken up in benzene and worked up in the manner described in Example 5. Titration of a sample of this product with standard potassium hydroxide solution showed that it contained 52.4% of alkyl salicylic acid, the remainder being unconverted phenol.

The above reaction product from the first stage was again converted to the sodium derivatives by reaction with solid sodium hydroxide in butanol solution, followed by evaporation of the water of reaction and the butanol. The amount of sodium hydroxide employed was the theoretical amount required to react with all the carboxy and hydroxy groups with a 5% excess. 234 grams of this reaction mixture were reacted in a second carboxylation stage at 165° C. for 2 hours under a carbon dioxide pressure of 500 pounds per square inch gauge. The product was again taken up in benzene and worked up as before. 253 grams of product were recovered. Titration of a sample of this product with standard potassium hydroxide solution showed that it contained 97.2% of alkyl salicylic acid.

As shown by the above examples, substantially complete conversions of high molecular weight alkyl phenols, including a di-alkyl phenol, to the corresponding hydroxy acids were obtained by reacting them with carbon dioxide in two stages with replacement of active hydrogen atoms in the reaction mass by sodium between the stages. The products obtained were of sufficient purity to be suitable for use without purification as lubricating oil additives, either per se or after conversion to suitable polyvalent metal salts or other derivatives according to conventional practice. The difficult separation of unconverted phenol from the reaction product was thus avoided by employing the method of our invention, and in addition the yields obtained were surprisingly much higher than those obtainable by separating unconverted phenol, reconverting it to the sodium salt and re-treating it separately with carbon dioxide. Thus, as shown by Examples 1 and 2, a high molecular weight alkyl phenol was only 40% converted to the corresponding acid by reacting it with carbon dioxide at 163° C. under 220 pounds pressure for 5 hours, and increasing the reaction time to 10 hours, employing a somewhat higher pressure, only increased the conversion to about 50%. However, when the 40% converted reaction product was treated with alkali and then reacted further with carbon dioxide, the conversion proceeded substantially to completion within a total reaction time of 10 hours. The conversion obtained was therefore about 25% higher than that obtainable by separately carboxylating the unconverted phenol, figured on the basis of a 50% conversion in each carboxylation reaction. As shown by Examples 4, 5 and 6, complete conversion of high molecular weight alkyl phenols was obtained in greatly shortened reaction times by employing pressures of about 500 pounds per square inch, with alkali treating of the reaction mass after about 50–60% conversion had occurred.

While high molecular weight alkyl phenols were employed as the reactants in the above examples, it is to be understood that other types of phenolic compounds, as set forth hereinabove, may also be employed in the reaction, since it is well known that the carboxylation reaction with carbon dioxide takes place with hydroxy aromatic compounds generally under similar reaction conditions. Thus the preparation of hydroxy naphthoic acids may advantageously be carried out by the method of our invention, employing alpha or beta naphthol as the phenolic reactant. By employing unsubstituted phenol as the reactant, salicylic acid in a high degree of purity suitable for use in medicinal preparations, etc., may readily be obtained by this method. Also, while sodium has been used in the examples given to form the phenolic salts employed in the carboxylation reaction, our invention is not to be construed as limited to the use of this particular alkali metal, since it is well known that alkali metals generally may be used for this purpose, potassium being very commonly employed.

Obviously many modifications and variations of the invention, as hereinbefore set forth, may be made without departing from the spirit and scope thereof and, therefore, only such limitations should be imposed as are indicated in the appended claims.

We claim:

1. The process of carboxylating a hydroxy aromatic compound by reacting an alkali metal salt thereof with carbon dioxide in the absence of water at a temperature in about the range 100–300° C. and under superatmospheric pressure, wherein the said carboxylation process is carried out in stages and the reaction mass is subjected to a neutralization reaction between the said carboxylation stages so as to convert at least a major portion of the hydroxy and carboxy groups in the said reaction mass into the corresponding alkali metal derivatives.

2. The process of carboxylating a hydroxy aromatic compound by reacting an alkali metal salt thereof with carbon dioxide in the absence of water at a temperature in about the range 100–300° C. and under superatmospheric pressure, wherein the said carboxylation process is carried out in two stages and the reaction mass is subjected to a neutralization reaction between the said carboxylation stages so as to convert substantially all of the hydroxy and carboxy groups in the said reaction mass into the corresponding alkali metal derivatives.

3. The process of carboxylating an alkyl ($C_{8-35}$) phenol by reacting an alkali metal salt thereof with carbon dioxide in the absence of water at a temperature in about the range 140–190° C. under a pressure of about 200–800 pounds per square inch, wherein the said carboxylation process is carried out in stages and the reaction mass is subjected to a neutralization reaction between the said carboxylation stages so as to convert at least a major portion of the hydroxy and carboxy groups in the said reaction mass into the corresponding alkali metal derivatives.

4. Claim 3 wherein the alkali metal is sodium.

5. Claim 3 wherein the carboxylation process is carried out in the presence of a hydrocarbon oil having a boiling point range within the lubricating oil range.

6. The process of carboxylating an alkyl ($C_{8-35}$) phenol by reacting the sodium salt thereof with carbon dioxide at a temperature in about the range 140–190° C. and under a pressure of about 200–800 pounds per square inch, in the absence of water and in the presence of a hydrocarbon oil having a boiling range within the lubricating oil range, wherein the said carboxylation process is carried out in two stages and the reaction mass is subjected to a neutralization reaction between the said carboxylation stages so as to convert at least a major portion of the hydroxy and carboxy groups in the said reaction mass into the corresponding sodium derivatives.

7. Claim 6 wherein the carboxylation reaction is carried out in each of the said carboxylation stages until substantially no further reaction occurs.

8. Claim 6 wherein the said alkyl ($C_{8-35}$) phenol is about 94–100% converted to the corresponding hydroxy aromatic acid in the two carboxylation stages.

9. The process of carboxylating a hydroxy aromatic compound by reacting an alkali metal salt thereof with carbon dioxide in the absence of water at a temperature in about the range 100–300° C. and under superatmospheric pressure, wherein the said carboxylation process is carried out in stages and the reaction mass is treated between the said carboxylation stages with an alkali metal reagent selected from the group consisting of alkali metals and alkali metal compounds which are capable of reacting with hydroxy aromatic compounds to form the corresponding alkali metal salts, said treatment with alkali metal reagent being carried out so as to convert at least a major portion of the hydroxy and carboxy groups in the said reaction mass into the corresponding alkali metal derivatives.

10. The process of carboxylating an alkyl ($C_{8-35}$) phenol by reacting an alkali metal salt thereof with carbon dioxide in the absence of water at a temperature in about the range 140–190° C. under a pressure of about 200–800 pounds per square inch, wherein the said carboxylation process is carried out in two stages and the reaction mass is treated between the said carboxylation stages with an alkali metal reagent selected from the group consisting of alkali metals and alkali metal compounds which are capable of reacting with hydroxy aromatic compounds to form the corresponding alkali metal salts, said treatment with alkali metal reagent being carried out so as to convert substantially all of the hydroxy and carboxy groups in the said reaction mass into the corresponding alkali metal derivatives.

11. The process of carboxylating a hydroxy aromatic compound by reacting an alkali metal salt thereof with carbon dioxide in the absence of water at a temperature in about the range 100–300° C. and under superatmospheric pressure in successive carboxylation stages, wherein the reaction mass is reacted between the said carboxylation stages with an alkali metal hydroxide so as to convert at least a major portion of the hydroxy and carboxy groups in the said reaction mass into the corresponding alkali metal derivatives and the water formed in the said reaction with alkali metal hydroxide is removed from the said reaction mass before the next carboxylation stage.

12. The process of carboxylating an alkyl ($C_{8-35}$) phenol by reacting an alkali metal salt thereof with carbon dioxide in the absence of water at a temperature in about the range 140–190° C. and under a pressure of about 200–800 pounds per square inch in successive carboxylation stages, wherein the reaction mass is reacted between the said carboxylation stages with an alkali metal hydroxide so as to convert at least a major portion of the hydroxy and carboxy groups in the said reaction mass into the corresponding alkali metal derivatives and the water formed in the said reaction with alkali metal hydroxide is removed from the said reaction mass before the next carboxylation stage.

13. The process of converting a $C_{8-35}$ alkyl phenol into the corresponding alkyl salicylic acid by reacting the sodium salt thereof with carbon dioxide in a first carboxylation stage in the absence of water at a temperature of about 160–170° C. and under about 400–600 pounds per square inch pressure until about 40–60% of the phenol has been converted into the corresponding acid, treating the reaction mass from this first carboxylation stage with sodium hydroxide in an amount sufficient to react with substantially all free hydroxy and carboxy groups present in the mass, removing the water of reaction by distillation, and again reacting the reaction mass with carbon dioxide in a second carboxylation stage in the absence of water at a temperature of about 160–170° C. and under about 400–600 pounds per square inch pressure until substantially no further reaction occurs.

14. Claim 13 wherein a small excess up to about 10% excess of sodium hydroxide is employed in treating the reaction mass.

References Cited in the file of this patent

UNITED STATES PATENTS

| Number | Name | Date |
|---|---|---|
| 150,867 | Kolbe | May 12, 1874 |
| 2,534,022 | Higgins | Dec. 12, 1950 |

FOREIGN PATENTS

| Number | Country | Date |
|---|---|---|
| 647,981 | Great Britain | Dec. 28, 1950 |

OTHER REFERENCES

Kolbe et al.: Liebig's Ann. Vol. 113, page 126 (1860).

Kolbe et al.: Liebig's Ann. Vol. 115, pages 201–206 (1860).